Oct. 29, 1929.  A. GUITSCHULA  1,733,536
CASTER WHEEL BRAKE
Filed Jan. 31, 1928
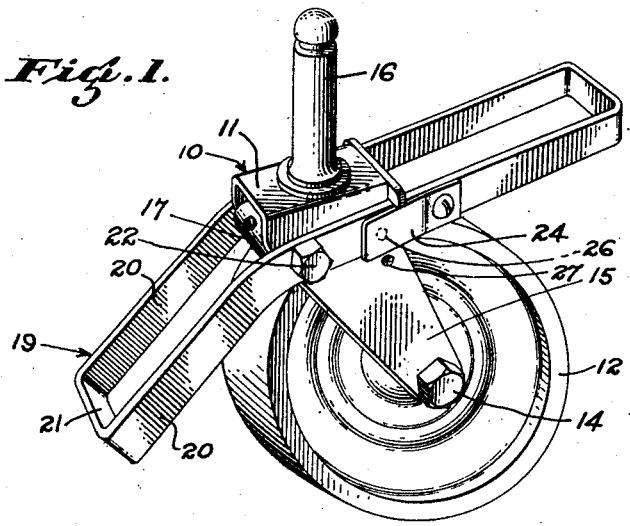
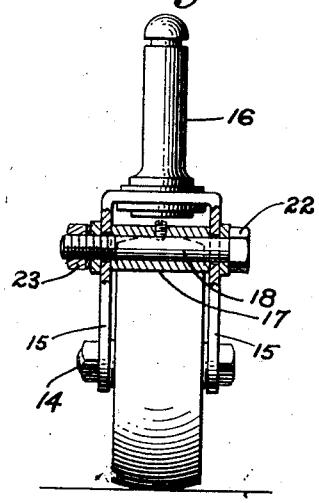
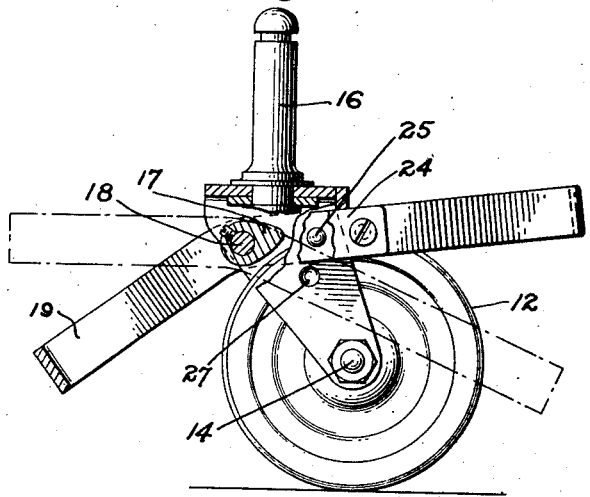
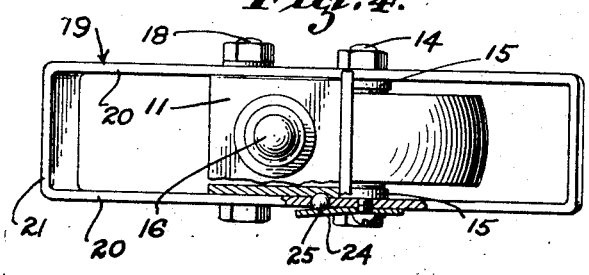
INVENTOR.
André Guitschula.
BY
Townsend, Loftus & Hatfield
ATTORNEYS.

Patented Oct. 29, 1929

1,733,536

UNITED STATES PATENT OFFICE

ANDRÉ GUITSCHULA, OF OAKLAND, CALIFORNIA, ASSIGNOR TO EAMES COMPANY, OF SAN FRANCISCO, CALIFORNIA, A CORPORATION OF CALIFORNIA

CASTER-WHEEL BRAKE

Application filed January 31, 1928. Serial No. 250,768.

This invention relates to caster wheel structures and particularly pertains to a brake structure therefor.

It is the principal object of the present invention to provide a generally improved brake structure for caster wheels, which brake structure is simple in construction, inexpensive to manufacture and capable of operation to effectively prevent rotation of the wheel relative to its fork.

In carrying out the invention into practice, the fork of the caster wheel structure is fitted with a cam which may be revolved by means of a lever to engage the periphery of the wheel and to hold it against rotation relative to the fork. This cam is adjustable relative to the wheel and is fitted with latching means to latch it either in braking or non-braking position.

One form which the invention may assume is exemplified in the following description and illustrated by way of example in the accompanying drawings, in which:

Fig. 1 is a perspective view of a caster wheel embodying the preferred form of my invention.

Fig. 2 is a view in end elevation of the caster wheel with parts in section.

Fig. 3 is a side elevation of the wheel with parts broken away and in section to more clearly disclose its construction.

Fig. 4 is a plan view with the latch mechanism in section.

Referring more particularly to the accompanying drawings, 10 indicates a caster wheel assembly including a fork 11 which embraces a wheel 12. This wheel 12 is mounted on an axle 14 extending laterally between the lower ends of the legs 15 of the fork. The fork 11 is fitted at its upper end with a spindle 16 or other suitable device for mounting the caster on a vehicle in connection with which casters are employed.

The present application is particularly concerned with a brake mechanism to prevent rotation of the wheel relative to the fork and thus effectively arrest movement of the vehicle upon which the caster is mounted. This brake mechanism comprises a pear-shaped cam 17 disposed intermediate the legs 15 of the fork above the wheel and parallel to the peripheral surface of the wheel. This cam 17 is secured on a shaft 18 extending between the legs 15 of the fork. The shaft 18 is pivotally mounted in openings in the legs 15 of the fork, so that the cam may be revolved.

To operate the cam, I provide a lever 19 having side portions 20 which are connected by end portions 21. The spacing between the side portions 20 is such that the lever embraces the fork 11 with the side portions 20 lying parallel to and contiguous to the exterior surface of the legs 15.

To connect the cam 17 to the lever 19, the cam shaft 18 extends through the side portions 20 of the lever 19. At one end the shaft 18 is fitted with a head 22. The other end of the shaft is threaded through a tapped opening in the lever 19, and is fitted with a clamping nut and washer 23. Therefore, to adjust the cam relative to the wheel, it is only necessary to loosen the nut 23 and turn the shaft 18 by means of its head 22. As the cam is fixed to the shaft, it will turn therewith and the bulge on the cam will be adjusted relative to the periphery of the wheel by such turning movement of the shaft. After the proper adjustment has been obtained the nut 23 is tightened to clamp the shaft 18 to the lever 19.

It is obvious from the foregoing that by oscillating the lever 19, the high point of the cam 17 will be thrown into or out of engagement with the peripheral surface of the wheel. When the cam engages the wheel, the latter will be effectively held from turning movement relative to the fork.

To latch the cam in either braking or non-braking position, I provide a latching mechanism which comprises a flat spring clip 24 secured at one end to one of the side members 20 of the lever 19. Underlying the other end of this spring clip 24 is an opening through the side member 20 of the lever 19 in which a ball 25 is disposed. The spring clip constantly tends to project this ball through the opening so that it will engage the exterior surface of the continguous leg of the fork. In this exterior surface of the leg of the fork is formed two sockets 26 and 27. These sockets are a spaced distance apart and are so located that when the ball 25 is engaged with the socket 26, the cam 17 will be out of engagement with the wheel, and when the ball is in engagement with the socket 27 the cam will be held in engagement with the wheel. As the ball 25 is spring-pressed into these sockets 26 and 27, the cam will be yieldably latched in either position desired and may be moved from one position to the other by operating the lever 19.

In operation of the device, it is constructed and assembled as shown in the drawings and the cam 17 is adjusted relative to the periphery of the wheel by loosening the nut 23 and revolving the shaft 18 upon which the cam is secured. When properly adjusted, the nut 23 is tightened securing the shaft and its cam to the lever 19. The cam will then be held rigid relative to the lever 19 but will be rotatively supported by the fork of the caster.

To move the cam into braking position, the lever 19 is actuated in a direction tending to throw the high point of the cam into contact with the peripheral surface of the wheel. When in this position, the ball 25 will snap into the socket 27 and latch the cam in braking position and the wheel will be effectively held against rotary movement relative to the fork.

To release the brake, a force is exerted on the lever 19 sufficient to disengage the ball 25 from the socket 27 and to move the lever to a position where the ball will engage the socket 26. In this position, the cam will be disengaged from the wheel and the latter will be free to revolve.

From the foregoing it is obvious that I have provided a very simple and inexpensive brake for caster wheels which will be positive in operation, inexpensive to manufacture and wherein the braking element will be yieldably held in either braking or non-braking position.

While I have shown the preferred form of my invention, it is to be understood that various changes may be made in its construction by those skilled in the art without departing from the spirit of the invention, as defined in the appended claim.

Having thus described my invention, what I claim and desire to secure by Letters Patent is:

A caster structure including a fork, a wheel embraced thereby, a cam rotatably supported between the legs of the fork in a position whereby its high point may engage the periphery of the wheel, a lever relatively fixed to the cam, means for adjusting the cam relative to the lever, and means for yieldably retaining said cam in either braking or non-braking position, said means comprising sockets formed in the fork, a latch member carried by the lever engageable with said sockets, and spring means constantly tending to press said latch member into the sockets.

ANDRÉ GUITSCHULA.